Patented Feb. 28, 1950

2,499,133

UNITED STATES PATENT OFFICE 2,499,133

MONAZO DYESTUFF

Karl F. Conrad, Eggertsville, N. Y., assignor to Allied Chemical & Dye Corporation, New York, N. Y., a corporation of New York No Drawing. Application December 18, 1945, Serial No. 635,783

4 Claims. (Cl. 260—151)

This invention relates to monazo dyestuffs (i. e. mono-azo dyestuffs) in which two hydroxy-aryl radicals are linked by an azo group in the ortho-positions to the hydroxyl groups. It relates more particularly to monazo dyestuffs of said type, in the unmetallized and metallized forms, wherein the diazo component is a derivative of ortho-aminophenol and the coupling component is a derivative of beta-naphthol.

I have found that certain monazo dyestuffs of the said type—namely, those dyestuffs wherein a hydroxybenzene radical containing at least one sulfonamide radical as a nuclear substitutent, but being otherwise unsulfonated, is linked by an azo group with a 1-acylamino-7-naphthol (that is, an N-acyl derivative of 1-amino-7-naphthol)—constitute a class of valuable dyestuffs having desirable shade, fastness, and other properties, in the unmetallized and metallized forms. For example, the monazo dyestuff which corresponds with the following formula:

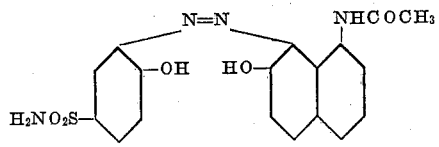

and which is obtainable by coupling diazotized 1-amino-2-hydroxybenzene-5-sulfonamide with 1-acetylamino-7-naphthol in an alkaline medium, is a valuable dyestuff for animal fibers; it dyes wool from an acid bath violet-blue shades which when chromed on the fiber are converted to blue-black of excellent fastness properties, and it forms a chromium complex (by reaction with chromium compounds capable of converting chromable azo dyestuffs to their chromium complexes) which dyes wool from a neutral or acid dyebath in level bluish-grey to bluish-black shades having excellent fastness to light, washing, and fulling.

The hydroxybenzene sulfonamide radical may contain one or more sulfonamide radicals, which may be variously oriented with respect to the hydroxyl and azo groups, and it may contain additional nuclear substituents, for example, halogen, alkyl, alkoxy, and/or nitro groups. The sulfonamide radicals may be unsubstituted —$SO_2NH_2$ groups, or they may be substituted groups, as, for example, the N-alkyl, N-hydroxyalkyl, N-cycloalkyl or N-aryl derivatives thereof.

Various acyl radicals may serve as the acyl component of the 1-acylamino-7-naphthol radical; for example, acetyl, benzoyl, p-toluenesulfonyl, furoyl, salicylsulfonyl, carbomethoxy, chloroacetyl, hexahydrobenzoyl, and phenoxyacetyl. The 1-acylamino-7-naphthol radical is linked to the azo group in the 8-position.

The dyestuffs may be obtained in various ways. A simple and advantageous method comprises diazotization of a 1-amino-2-hydroxybenzene sulfonamide (for example, 1-amino-2-hydroxybenzene-5-sulfonamide, 1-amino-2-hydroxybenzene-4-sulfonamide, 1-amino-2-hydroxybenzene-5-(N-phenyl) sulfonamide, 1-amino-2-hydroxy-5-chlorobenzene- 3 - sulfonamide, 1-amino-2 - hydroxy-3-nitrobenzene-5-sulfonamide, 1-amino-2-hydroxybenzene-5- (N-diethyl) sulfonamide, or 1-amino-2 -hydroxybenzene -5 -(N-cyclohexyl) sulfonamide) and coupling of the resulting diazo compound in an alkaline medium with a 1-acylamino-7-naphthol (for example, 1-acetylamino-7-naphthol, 1-benzoylamino-7-naphthol, 1-furoylamino-7-naphthol, or 1-para-toluenesulfonylamino-7-naphthol).

The unmetallized dyestuffs of the present invention may be converted into metal complexes in substance or on the fiber by treatment with metallizing agents according to known general methods. Water-soluble salts of various metals can be used as metallizing agents, those having atomic weights from 52 to 66 being the most suitable. As examples, water-soluble salts of inorganic or organic acids (such as sulfates, halides, formates, and acetates) with such metals as chromium, copper, nickel, cobalt, manganese, and iron are mentioned.

Thus, metalliferous dyestuffs can be obtained by treating the metal-free dyestuffs with chromium fluoride, chromium chloride, chromium acetate, chromium sulfate, copper sulfate, copper acetate, nickel sulfate, etc., in the presence of water and/or an organic solvent, for example, ethyl alcohol, pyridine, etc. The amount of metallizing agent employed preferably should be sufficient to provide at least one atomic proportion of metal for each molecular proportion of monazo dyestuff. The metal-free and metalliferous dyestuffs may be recovered from aqueous solution by salting (e. g. with common salt, Glauber's salt, etc.) to precipitate the dyestuffs, and the precipitated dyestuffs may be separated from the mother liquors by filtration. Where the metalliferous dyestuff is prepared in solution in an organic solvent, it may be obtained as a residue by evaporation of the organic solvent.

For example, in preparing chromium-containing dyestuffs of the present invention in accordance with one method of procedure, the unmetallized monazo dyestuff is boiled in aqueous solution with a chroming agent in sufficient amount to provide at least one atomic proportion of chromium for each molecular proportion of the dyestuff. After filtering the aqueous mass to remove insoluble matter therefrom, the resulting chromium complex of the dyestuff may be isolated and recovered from the filtered solution; for example, by salting out, filtering, and drying the filter cake. Preferably the chroming is carried out by means of chromium trifluoride in the presence of powdered glass or other substances capable of neutralizing hydrofluoric acid, for example, other alkali metal silicate, sodium acetate, magnesium carbonate, and the like.

The metal-free and metalliferous dyestuffs of the present invention are suitable for coloring various materials in shades which are distinguished by good fastness properties. Thus, they may be used to color animal fibers (e. g. wool, unloaded and loaded silk), animal-like fibers (e. g. nylon and Aralac), synthetic resins, cellulose esters and ethers, natural resins, organic solvents (e. g. alcohol, acetone, etc.), stains, varnishes, lacquers, leather, paper, etc.

The invention will be illustrated by the following specific examples in which the parts are by weight and the temperatures are in degrees centigrade.

Example 1

188 parts of 1-amino-2-hydroxybenzene-5-sulfonamide were agitated with 1,300 parts of water, 290 parts of 20° Bé. hydrochloric acid and 800 parts of ice, and diazotized at 5° to 10° during about one hour by adding a solution of 69 parts of sodium nitrite in 200 parts of water. The diazotized 1-amino-2-hydroxybenzene-5-sulfonamide thus obtained was introduced during a half hour into an agitated solution prepared by dissolving 220 parts of 1-acetylamino-7-naphthol in 2,000 parts of water to which had been added 120 parts of 50% aqueous sodium hydroxide and 300 parts of soda ash, and cooled to 0° by the addition of 800 parts of ice. The reaction mass was then agitated at 5° to 10° for about 5 hours, and thereafter overnight without temperature control. 360 parts of common salt were added, and the mass was agitated for about 2 hours to practically completely precipitate the dyestuff, which was then separated by filtration. The filter-cake was washed with about 6,000 parts of a 5% aqueous solution of sodium chloride, to remove alkali and other impurities.

The dyestuff thus obtained corresponded with the following formula:

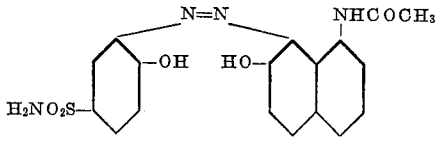

When dried and ground, it was a black powder, sparingly soluble in water to give a bluish-violet solution, and dyeing wool violet-blue shades from an acid bath. It yielded blue-black shades on wool when chromed on the fiber by the metachrome, top-chrome, or bottom-chrome methods.

Example 2

The washed filter cake obtained by the process of Example 1 was agitated with 15,000 parts of water. 660 parts of hydrous chromium fluoride (containing 338 parts of $CrF_3$) and 100 parts of glass powder were added to the agitated aqueous mixture, which was then heated to 98° to 100° with live steam and maintained at that temperature for about 24 hours. At the end of that period, the dyestuff was mostly out of solution. The agitated mass was then treated with 750 parts of common salt, allowed to cool to about 40°, when the chromed dyestuff was completely out of solution, and filtered. The filter cake was mixed with a solution of 285 parts of sodium hydroxide in 15,285 parts of water, and the mixture thus obtained was heated to 65° and agitated at that temperature until the dyestuff was completely dissolved and the chromium was precipitated as the hydroxide (about 20 minutes). The mass was then filtered through a sludge press coated with Filter Cel, the agitated filtrate was rendered acid to Congo Red paper with 406 parts of 20° Bé. hydrochloric acid, to precipitate the chromiferous dyestuff, and the latter was separated by filtration, dried at 50° to 60°, and ground.

The chromiferous dyestuff thus obtained was a black powder, which was soluble in concentrated sulfuric acid with a bluish-red color, fairly soluble in water with a bluish-black color, and very soluble in aqueous sodium carbonate with a bluish-black color. It dyed wool from a neutral or acid dyebath in level bluish-grey to bluish-black shades (depending on the amount of dyestuff employed) which possessed excellent fastness to light, washing and fulling. It dyed paper, leather, nylon, silk and tin-weighted silk in valuable bluish-grey to black shades. It was soluble in organic solvents (for example, ethyl alcohol, acetone, pyridine, etc.) and in nitrocellulose, with a bluish-grey to bluish-black color, which properties make it a valuable dyestuff for coloring stains, lacquers, varnishes, etc.

A similar result was obtained by subjecting the unwashed filter cake of the dyestuff obtained in the process of Example 1 to the chroming process of this example.

Instead of chromium fluoride, the equivalent quantity of chromium formate or chromium acetate can be used in either case.

Example 3

11.7 parts of 1-amino-2-hydroxy-3-nitrobenzene-5-sulfonamide were agitated with 200 parts of water, 15 parts of 20° Bé. hydrochloric acid and 100 parts of ice, and diazotized during one hour at about 5° to 10° by addition of 3.6 parts of powdered sodium nitrite. The resulting aqueous diazo reaction mixture was stirred slowly into a mixture prepared from 12 parts of 1-acetylamino-7-naphthol, 200 parts of water, 2 parts of sodium hydroxide chips, 10 parts of sodium carbonate, 20 parts of pyridine, and 200 parts of ice, and the mixture thus obtained was agitated for 16 hours at about 10°. To the resulting reaction mixture, 100 parts of common salt were added, followed by sufficient hydrochloric acid to render the mixture neutral to Brilliant Yellow paper. The precipitate of the monazo dyestuff thus produced was separated by filtration.

The resulting dyestuff corresponded with the following formula

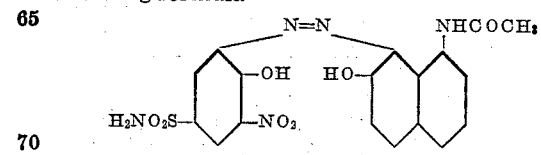

Example 4

The filter cake obtained by the process of Example 3 was stirred with 500 parts of water and the mixture was heated to 80°. 32.9 parts of hydrous chromium fluoride (corresponding to 7.9 parts of metallic chromium) and 15 parts of glass powder were added with agitation, and the resulting mass was boiled with agitation for 24 hours, while keeping the volume substantially constant by addition of water or by means of a reflux condenser, to effect complete chromation of the monazo dyestuff. The reaction mass was cooled to 90° and filtered through a filter coated with Filter Cel. To the resulting filtrate, 150 parts of sodium chloride were added and the mixture was allowed to cool to room temperature while being stirred, whereby the chromium-containing dyestuff precipitated. The precipitated dyestuff was separated by filtration, dried at 50° to 60°, and ground.

The chromiferous dyestuff thus obtained was a blue-black powder, which was soluble in concentrated sulfuric acid with a red-violet color, fairly soluble in water with a reddish-grey-black color, which become greenish-grey-black on addition of aqueous sodium carbonate. It dyed wool from a neutral or acid dyebath in level bluish-grey to bluish-black shades (depending on the amount of dyestuff employed) which possessed good fastness to light, and excellent fastness to washing and fulling. The dyeings on wool were of a greener cast than the dyeings of the chromium-containing dyestuff of Example 2.

Instead of chromium fluoride, the equivalent quantity of chromium acetate or chromium formate can be used.

*Example 5*

11 parts of 1-amino-2-hydroxy-5-chlorbenzene-3-sulfonamide were agitated with 200 parts of water and ice and 15 parts of 20° Bé. hydrochloric acid, and diazotized during one hour at 5° to 10° by addition of 3.6 parts of powdered sodium nitrite. The resulting aqueous diazo reaction mixture was stirred into a mixture prepared from 12 parts of 1-acetylamino-7-naphthol, 3 parts of sodium hydroxide, 15 parts of sodium carbonate, and 200 parts of water and ice; and the resulting mixture was agitated for 16 hours at about 10°. To the resulting reaction mixture, 100 parts of common salt were added, followed by sufficient hydrochloric acid to render the mixture neutral to Brilliant Yellow paper. The precipitated monazo dyestuff thus produced was separated by filtration.

The dyestuff thus obtained corresponded with the following formula:

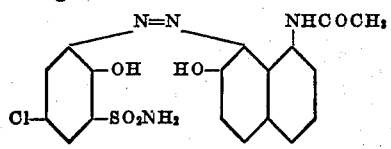

*Example 6*

The filter cake obtained by the process of Example 5 was stirred with 500 parts of water, and the mixture was heated to 80°. 43.3 parts of hydrous chromium fluoride (corresponding to 10.4 parts of metallic chromium) and 10 parts of glass powder were added with agitation and the resulting mixture was boiled with agitation for 24 hours, while keeping the volume substantially constant by addition of water or by means of a reflux condenser, to effect complete chromation of the monazo dyestuff. The reaction mass was cooled to room temperature and then filtered.

The filter cake thus obtained was slurried in 500 parts of water, the slurry was made alkaline to phenolphthalein by addition of sodium hydroxide, heated to 60° for about 15 minutes, and the precipitated chromium hydroxide was separated from the solution of the dyestuff by filtration. To the resulting filtrate 100 parts of sodium chloride were added, followed by sufficient hydrochloric acid to render the mass neutral to Brilliant Yellow paper, whereby the resulting chromium-containing dyestuff precipitated. The precipitated dyestuff was separated by filtration, dried at 50° to 60°, and ground.

The chromiferous dyestuff thus obtained was a black powder which was soluble in concentrated sulfuric acid with a blue-violet color, fairly soluble in water with a grey-black color, which became reddish-grey-black on addition of aqueous sodium carbonate. It dyed wool from a neutral or acid dyebath in level bluish-grey to bluish-black shades (depending on the amount of dyestuff employed) which possessed good fastness to light and to fulling, and superior fastness to washing as compared with the chromium-containing dyestuff of Example 2. The dyeings on wool were of a somewhat greener cast than the dyeings of the chromium-containing dyestuff of Example 4.

I claim:

1. A dyestuff selected from the class consisting of the mono-azo dyestuffs which correspond with the following formula:

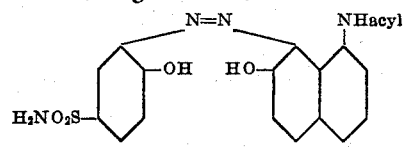

wherein NHacyl is an acylamino radical, and the metal complexes of said mono-azo dyestuffs.

2. A mono-azo dyestuff which corresponds with the following formula:

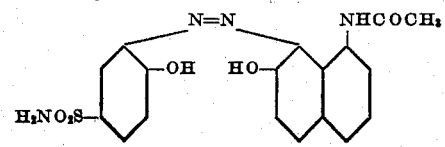

said dyestuff dyeing wool from an acid bath violet-blue shades which when chromed on the fiber are converted to blue-black.

3. A metal complex of the mono-azo dyestuff defined in claim 2.

4. A chromium complex of the mono-azo dyestuff defined in claim 2.

KARL F. CONRAD.

REFERENCES CITED

The following references are of record in the file of this patent:

UNITED STATES PATENTS

| Number | Name | Date |
|---|---|---|
| 1,078,925 | Kahn | Nov. 18, 1913 |
| 1,835,821 | Straub | Dec. 8, 1931 |
| 1,925,434 | Clingestein | Sept. 5, 1933 |
| 2,024,864 | Kopp | Dec. 17, 1935 |
| 2,033,341 | Krzikalla | Mar. 10, 1936 |

FOREIGN PATENTS

| Number | Country | Date |
|---|---|---|
| 142,448 | Great Britain | June 27, 1921 |